US009068577B2

(12) United States Patent
Kasagi et al.

(10) Patent No.: US 9,068,577 B2
(45) Date of Patent: Jun. 30, 2015

(54) SOLENOID VALVE

(75) Inventors: Yoshinari Kasagi, Tokyo (JP); Hiroyuki Nishinosono, Tokyo (JP); Hiroyuki Iwanaga, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 13/703,927

(22) PCT Filed: Nov. 18, 2011

(86) PCT No.: PCT/JP2011/076715
§ 371 (c)(1),
(2), (4) Date: Dec. 13, 2012

(87) PCT Pub. No.: WO2012/077486
PCT Pub. Date: Jun. 14, 2012

(65) Prior Publication Data
US 2013/0248743 A1 Sep. 26, 2013

(30) Foreign Application Priority Data

Dec. 6, 2010 (JP) ................................. 2010-271522

(51) Int. Cl.
*F15B 13/04* (2006.01)
*F16K 31/06* (2006.01)
(Continued)

(52) U.S. Cl.
CPC ......... *F15B 13/0401* (2013.01); *F16K 31/0624* (2013.01); *F16K 31/0693* (2013.01); *H01F 7/126* (2013.01); *F16K 31/0613* (2013.01); *F15B 13/044* (2013.01); *F15B 2211/89* (2013.01)

(58) Field of Classification Search
CPC ............ F16K 31/0624; F16K 31/0693; F16K 31/0613; H01F 7/126; H01F 7/1607
USPC ......... 251/129.07, 129.15; 335/259, 261, 264
See application file for complete search history.

(56) References Cited

U.S. PATENT DOCUMENTS 4,540,154 A * 9/1985 Kolchinsky et al. ..... 251/129.15
4,662,605 A 5/1987 Garcia
(Continued)

FOREIGN PATENT DOCUMENTS

DE        10056200 A1    7/2001
DE    102007032873 A1   1/2009
(Continued)

OTHER PUBLICATIONS

International Search Report (in Japanese with English translation) for PCT/JP2011/076715, mailed Jan. 17, 2012; ISA/JP.
(Continued)

*Primary Examiner* — Matthew W Jellett
(74) *Attorney, Agent, or Firm* — Harness, Dickey & Pierce, PLC (57) ABSTRACT

The object of the present invention is to provide a solenoid valve which can be assembled easily and has good production efficiency.
A solenoid valve comprising; a valve sleeve (20) of cylindrical shape having an inner passage (22) continuing in an axial direction, a spool (30) arranged in a movable manner in said axial direction at said inner passage of said valve sleeve, a center post (40) of cylindrical shape having a through hole (42) connected with said inner passage of said valve sleeve and constituted from a magnetic material, a plunger (50) constituted from a magnetic material and arranged in a movable manner in said axial direction against said valve sleeve and said center post by placing said center post between said spool in said axial direction, a shaft (60) constituted from a non-magnetic material comprising an axis part (62) in which one end is brought into contact with said spool and other end attached to an end face of said plunger and moves in said axial direction inside said through hole of said center post, and a collar part (68) formed as one body with said axis part and sandwiched between said plunger and said center post when said plunger closely approaches said center post by protruding out in a radial direction from said axial part, and a case part comprising a coil (75) generating a magnetic force transferring to said center post and housing said plunger and said shaft in inside.

5 Claims, 5 Drawing Sheets

(51) Int. Cl.
*H01F 7/126* (2006.01)
*F15B 13/044* (2006.01)

(56) References Cited

U.S. PATENT DOCUMENTS

| | | | | |
|---|---|---|---|---|
| 6,409,144 | B1* | 6/2002 | Inami | 251/129.15 |
| 7,938,143 | B2* | 5/2011 | Nagasaki et al. | 137/625.68 |
| 2004/0251441 | A1* | 12/2004 | Schmitt et al. | 251/129.07 |
| 2005/0178991 | A1* | 8/2005 | Goossens et al. | 251/129.07 |
| 2009/0026399 | A1* | 1/2009 | Ishibashi | 251/129.15 |
| 2009/0032753 | A1* | 2/2009 | Ishibashi et al. | 251/129.15 |
| 2009/0140192 | A1* | 6/2009 | Yamamoto et al. | 251/129.15 |
| 2009/0256092 | A1 | 10/2009 | Nordstrom et al. | |
| 2010/0301978 | A1* | 12/2010 | Ishibashi | 335/255 |
| 2011/0062361 | A1* | 3/2011 | Yoshida et al. | 251/129.15 |

FOREIGN PATENT DOCUMENTS

| | | |
|---|---|---|
| JP | 2001-141098 A | 5/2001 |
| JP | 2002-228037 A | 8/2002 |
| JP | 2008-157270 A | 7/2008 |
| JP | 2009-030682 A | 2/2009 |

OTHER PUBLICATIONS

International Preliminary Report on Patentability (IPRP), PCT application No. PCT/JP2011/076715, dated Jun. 20, 2013.

EPO extended search report dated Mar. 2, 2015 (corresponding application).

* cited by examiner

SOLENOID VALVE

CROSS-REFERENCE TO RELATED APPLICATIONS

This application is a 371 U.S. National Stage of International Application No. PCT/JP2011/076715, filed on Nov. 18, 2011, and claims priority to Japanese Patent Application No. 2010-271522, filed on Dec. 6, 2010, the disclosures of which are herein incorporated by reference in their entirety.

TECHNICAL FIELD

The present invention relates to a solenoid valve suitably applied for a hydraulic control such as for example a hydraulic device or so.

BACKGROUND ART

As for a conventional solenoid valve, for example, those having a part of shaft having a hollow pipe shape being fixed by introducing into a through hole formed at the plunger, and a part of the shaft moves inside the magnetic opposing portion which magnetically attracts the plunger, is proposed (refer to Patent document 1).

Also, in the conventional arts, in order to prevent the plunger and the magnetic opposing part from being connected, the technique to place the plate in between the shaft and the plunger, the technique to process the end face of the plunger, or the technique to bend a part of the shaft are proposed.

PRIOR ART DOCUMENTS

Patent document 1: JP Patent Application Laid Open 2009-30682

DISCLOSURE OF THE INVENTION

Technical Problems to be Solved by the Invention

However, in the solenoid valve according to the conventional art has a structure wherein a part of a shaft is introduced into the through hole formed at the plunger, therefore it is necessary to carry out a mechanical processing which requires high accuracy such as the forming the through hole or so against the plunger. Also, even at the production of the shaft, when forming a non-metallic thin plate into an approximately pipe shape, the mechanical processing which requires high accuracy is necessary.

Therefore, the conventional solenoid valve had a problem in its production efficiency and the cost. This is because, if the mechanical processing of the plunger or the shaft are not sufficiently accurate, the shaft axis is shifted. Also, the technique of placing the plate in between the shaft and the plunger had a problem of which it took too much time to assemble, and as for the technique of providing the bending portion to the shaft had a problem in regards with the processing accuracy and the strength.

The present invention was attained by reflecting such problems, and its object is to provide a solenoid valve which is easily assembled and has excellent productivity by using the shaft and a plunger which can be easily produced and has only few mechanical processing required during the production of the parts.

Means for Solving the Technical Problems

In order to solve the above objects, the solenoid valve according to the present invention comprises;

a valve sleeve of cylindrical shape having an inner passage continuing in an axial direction, a spool arranged in a movable manner along said axial direction in said inner passage of said valve sleeve, a center post of cylindrical shape having a through hole connected with said inner passage of said valve sleeve and constituted from a magnetic material, a plunger constituted from a magnetic material and arranged in a movable manner along said axial direction against said valve sleeve and said center post by placing said center post between said spool and said plunger in said axial direction, a shaft constituted from a non-magnetic material comprising an axis part and a collar part, said axis part having one end being contacted with said spool and other end attached to an end face of said plunger and moving in said axial direction inside said through hole of said center post, and said collar part protruding out in a radial direction from said axis part so as to be formed as one body with said axis part and sandwiched between said plunger and said center post when said plunger closely approaches said center post, and a case part having a coil generating a magnetic force transferring to said center post and housing said center post, said plunger and said shaft in inside The solenoid valve according to the present invention comprises the shaft comprising the axis part and collar part that are made as one body with, the axis part moves inside the through hole of the center post, and the collar part protrudes out to the radial direction from the axis part and is sandwiched between the plunger and the center post. By using the shaft of which the collar part preventing the plunger and the center post from contacting made as one body with the axis body, the solenoid valve according to the present invention does not have to additionally assemble the members which prevents the plunger and the center post from contacting; thus it is easily assembled.

Also, as for the shaft, other end part of the axis part is attached to the end face of the plunger, thus it is not necessary to form a trough hole or so for attaching the shaft to the plunger. Also, as the shaft comprises the collar part, there is no need to form the projections or so to the plunger for preventing the magnetic bonding with the center post. Therefore, the plunger according to the present invention has only little mechanical processing necessary during the production, thus the production is easy.

Also, said shaft is preferably constituted by resin material. By constituting the shaft by the resin material, it becomes easy to mold a shape of which the collar part and the axis part are made as one body, thereby the mechanical processing necessary during the production is reduced thus the shaft can be produced easily.

Further, the outer peripheral shape cross section of said axis part in said shaft may comprise plurality of arc-shape portions arranged symmetrically around the center of said axis parts, and plurality of notch portions which connects said arc-shape portions.

In the axis parts having such outer peripheral shape cross section, the arc-shape portion slides against the inner wall of the through hole, and the space formed between the notch portion and inner wall of the though hole becomes an oil passage; therefore the transfer of the force and the stable movement in the axial direction can be realized by simple shape.

Also, said shaft may be molded by a cavity having a parting line positioned at said notch portion. When the shaft is produced by the molding, a burr may be generated at the parting line, however since the notch portion of the shaft becomes the oil passage without sliding against the inner wall of the through hole, thus even if the burr or the processing scar after the burr removal remains, it barely influence the movement of the shaft.

Also, said axis part of said shaft may comprise a plurality of larger diameter parts sliding against the inner wall of said through hole, and a plurality of smaller diameter parts arranged by both sides of said axial direction being placed between said larger diameter part, and the maximum diameter is smaller than said larger diameter part in the cross section shape.

Even if a large load is applied to the shaft or when the shaft is slightly bent, the shaft comprising the smaller diameter part and the larger diameter part can prevent the interference of the smooth movement to the axial direction caused by being caught inside the through hole. This is because the shaft comprising the smaller diameter part has larger allowable range of curvature in the through hole compared to the shaft having only the large diameter part.

BEST MODE FOR CARRYING OUT THE INVENTION

Figure 1:
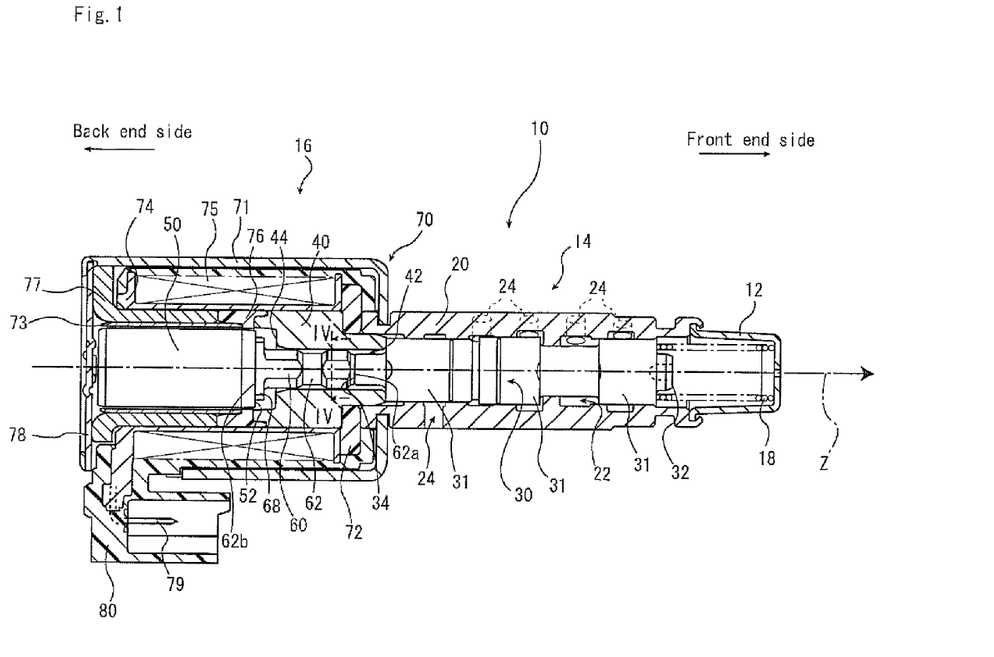
FIG. 1 is a cross section of the solenoid valve according to one embodiment of the present invention.

FIG. 1 is a cross section of the solenoid valve 10 according to one embodiment of the present invention. The solenoid valve 10 according to the present invention is a solenoid valve of spool type, and it is suitably used for controlling the negative pressure of the automatic transmission or so of the automobile; however the use of the solenoid valve 10 is not limited thereto.

As shown in FIG. 1, the solenoid valve 10 comprises a solenoid part (linear solenoid) 16 as the electric actuator, a valve main body 14 and a retainer 12. At the solenoid valve 10, the retainer 12 is mounted at one end of the valve main body 14, and the solenoid part 16 is mounted at other end of the valve main body 14. Each member constituting the solenoid valve 10 is defined by the side closely disposed to retainer 12 as the front end side and the side closely disposed to the end plate 78 of the solenoid part 16 as the back end side, along the Z axis direction of which the plunger 50, the shaft 60 and the spool 30 are disposed.

The valve main body 14 comprises a valve sleeve 20 of cylindrical shape having inner passage 22 continuing in Z axis direction, and a spool 30 arranged at the inner passage 22. At the peripheral wall of the valve sleeve 20, plurality of ports 24 connecting the inner passage 22 of the valve sleeve 20 to the outside are formed. The plurality of the ports 24 are constituted by a drain port, a control port, an input port and a feedback port or so, and a control fluid (for example, hydraulic oil or so) flows into the inner passage 22 via these ports 24 or flows out to other members from the inner passage 22.

The spool 30 is arranged at the inner passage 22 of the valve sleeve 20 in a movable manner along the Z axis direction. The spool 30 comprises plurality of lands 31 arranged along the axial direction. The land 31 has larger outer diameter than other member of spool 30, and the outer diameter of each land 31 is designed so that the spool 30 can receive an appropriate pressure from the control fluid. Also, the position of axial direction of each land 31 is designed so that each land 31 can appropriately control the opening amount of each port 24 together with the movement of the spool 30.

At the spool front end face 32 which is the end face of the front end side at the spool 30, a spring 18 housed inside the retainer 12 is contacted. The spring 18 is held between the spool 30 and the retainer 12 at both sides in the Z axis direction, thereby the spring force pressing the spool 30 towards the back end side is generated. The retainer 12 is fixed at the front end side of the valve sleeve 20 by crimp stop or so.

The material of the valve sleeve 20, the retainer 12, and the spool 30 are not particularly limited, however for example aluminum, iron, resin or so may be mentioned. Also, the valve sleeve 20, the retainer 12 and the spool 30 may be constituted by the magnetic material, or it may be constituted by non-magnetic material.

The solenoid part 16 comprises a center post 40, a plunger 50, a shaft 60 and a case 70 which houses these in the inside. The center post 40 comprises the through hole 42 connecting to the inner passage 22 of the valve sleeve 20, and has a cylindrical shape extending in the Z axis direction. Also, at the opening area of the back end side of the through hole 42, the step face 44 to which the collar part 68 of the shaft 60 contacts is formed.

The center post 40 is constituted by magnetic material such as iron or so, and it is magnetized by the magnetic force generated by a coil 75 of the case 70. Thereby, the center post 40 pulls the plunger 50 constituted by the magnetic material towards the center post 40 and this force is transferred to the spool 30 via the shaft 60 thereby it becomes a force (the electromagnetic force) of pressing the spool 30 to the front end side in the Z axis.

The plunger 50 is arranged at the back end side of the center post 40. That is, the plunger 50 is arranged in the movable manner in the axis direction by placing the center post 40 in the Z axis direction in between the spool 30 of the valve main body 14. The plunger 50 is constituted by the magnetic material such as iron or so, thus it is pulled towards the center post 40 magnetized by the magnetic force generated by the coil 75.

Figure 2:
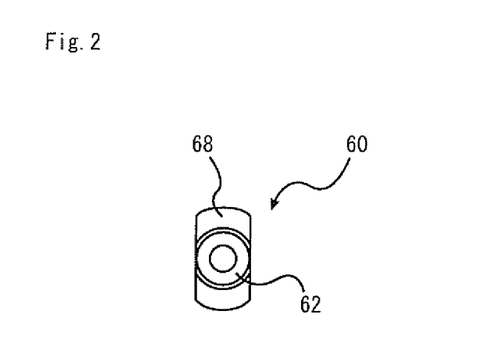
FIG. 2 is a side view of the shaft included in the solenoid valve shown in FIG. 1 observing from the spool side.
Figure 3:
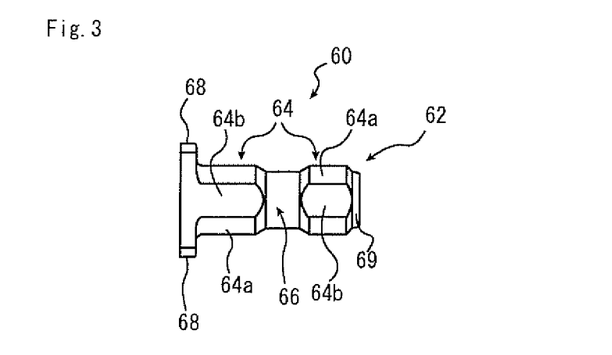
FIG. 3 is a front view of the shaft included in the solenoid valve shown in FIG. 1.

The shaft 60 is arranged between the plunger 50 and the spool 30, and transfers the pressing force caused by the electromagnetic force to the spool 30 from plunger 50. As shown in FIG. 2 and FIG. 3, the shaft 60 comprises the axis part 62 extending in the Z axis direction, and the collar part 68 formed at the back end side of the shaft 60 and protrudes in the radial direction from axis part 62.

As shown in FIG. 1, the first end face 62a which is the end face of the front end side at the axis part 62 is contacted with the spool back end face 34 which is the end face of the back end side of the spool 30. Also, the second end face 62b which is the end face of the backend side at the axis part 62 is attached to the plunger front end face 52 which is the end face at the front end side of the plunger 50. Except for a part of the back end side, the axis part 62 is arranged inside the through hole 42 of the center post 40. The axis part 62 moves inside the through hole 42 in the Z axis direction along with the movement of the center post 40 in the Z axis direction.

Figure 5:
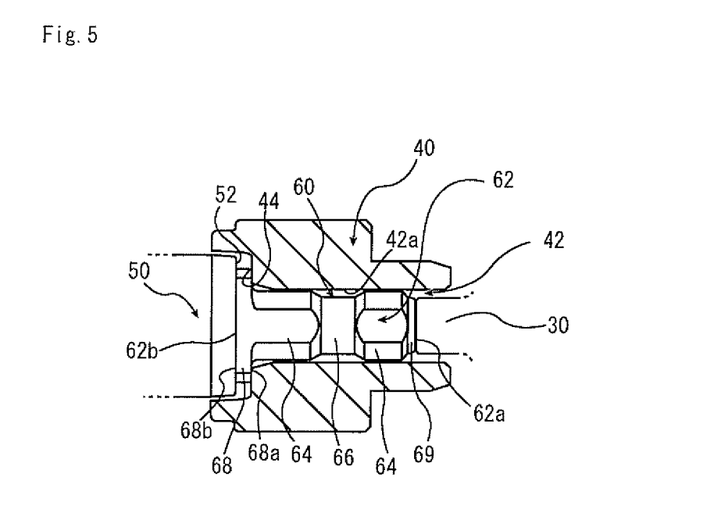
FIG. 5 is a cross section shows the relation of the relative position of the plunger, the shaft and the center post.

As shown in FIG. 2 and FIG. 3, the collar part 68 of the shaft 60 is formed as one body with the axis part 62. The collar part 68 protrudes out in the radial direction (the direction crossing in the right angle with the Z axis direction) from the axis part 62, and the maximum diameter of the collar part 68 is larger than the opening diameter of the through hole 42 at the center post 40. Therefore, the collar part 68 is, as shown in FIG. 5, sandwiched between the plunger 50 and the center post 40 when plunger 50 closely approaches the center post 40.

The shaft 60 is constituted from the non-magnetic material such as the resin material, the austenite stainless material, and copper or so, however it is preferably constituted by the resin material. By constituting the shaft 60 by the resin material, the shaft 60 wherein the axis part 62 and the collar part 68 are made as one body can be easily produced by molding or so.

The case—70 shown in FIG. 1 is a cylindrical shape member which houses the plunger 50, the center post 40 and the shaft 60 therein. The case 70 comprises the solenoid case 71, the lower plate 72, the bearing 73, the bobbin 74, the coil 75, the spacer 76, the side ring 77, the end plate 78, the terminal 79, and the molded article 80 or so.

The solenoid case 71 is a case of the solenoid part 16, and connects the solenoid part 16 and the valve main body 14. The lower plate 72 is a member for providing the center post 40, the bobbin 74 and the coil 75, and it is arranged at the front end side at the inside of the solenoid case 71. The side ring 77 is a member mainly for supporting the plunger 50, and it is arranged at the back end side from the center portion at the inside of the solenoid case 71. The bearing 73 is arranged in between the inner peripheral face of the side ring 77 and the outer peripheral face of the plunger 50, and it supports the plunger 50 against the case 70 in a movable manner in the axial direction. Note that, in between the center post 40, and the side ring 77 and the bearing 73, the spacer 76 is arranged.

The bobbin 74 and the coil 75 wind around the outer peripheral face of the bobbin 74 are arranged so that the bobbin 74 contacts with the outer peripheral face of the center post 40, the magnetic force generated by the coil 75 is efficiently transferred to the center post 40. The molded article 80 connects each member by arranged in the space of each member constituting the solenoid part 16, and also forms the connector for the external terminals connected to the terminal 79. When using the solenoid valve 10, the terminal 79 is connected with the external terminal thereby the electricity is supplied to the coil 75 via the terminal 79.

The end plate 78 is arranged at the back end of the case 70, and functions as the lid housing the plunger 50 or so at the front end side of the end plate 78. Also, at the end plate 78, the air hole is formed. The air hole allows the control fluid present at inside of the case 70 to flow when moving to the Z axis direction of the plunger 50.

FIG. 2 is a side view of the shaft 60 included in the solenoid valve 10 shown in FIG. 1 observing from the spool 30 side, and FIG. 3 is a front view of the shaft 60. As shown in FIG. 2 and FIG. 3, at the cross section shape of the shaft 60, the maximum outer diameter of the axis part 62 is smaller than the maximum outer diameter of the collar part 68, however in said axis part 62, the axis part 62 comprises the larger diameter part 64 which is relatively large in said axis part 62, and the smaller diameter part 66 having smaller maximum outer diameter than the larger diameter part 64.

As shown in FIG. 3, axis part 62 comprises two larger diameter parts 64 and one smaller diameter part 66, and the smaller diameter part 66 is arranged between the larger diameter parts 64 at the both sides in the Z axis direction. Note that, at the end part of the front end side of the axis part 62, the axis tip 69 contacting with the spool back end face 34 (refer to FIG. 1) of the spool 30 is formed.

Figure 4:
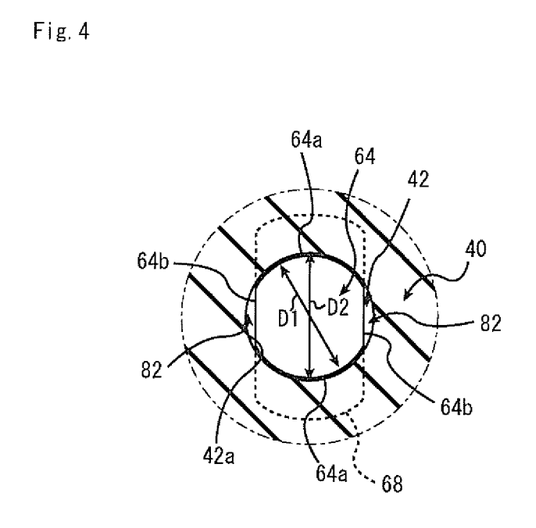
FIG. 4 is a cross section along the cross section line IV-IV in FIG. 1.

FIG. 4 is a cross section along the cross section line IV-IV in FIG. 1, and show the cross section shape of the larger diameter part 64 of the axis part 62. The cross section outer peripheral shape of the larger diameter part 64 comprises two arc shape portions 64a arranged symmetrically against the center of the axis part 62, and two straight line portions 64b connecting the two arc shape portions 64a.

The maximum outer diameter D1 of the larger diameter part 64 is the length of the straight line connecting the two arc shape portions 64a passing through the center of the axis part 62 in FIG. 4, and the maximum outer diameter D1 is roughly the same as the diameter D2 of the through hole 42 having approximately a circular cross section shape, or slightly smaller than the diameter D2 of the through hole 42. Therefore, when the shaft 60 moves to the Z axis direction, the arc shape portion 64a of the axis part 62 slides with the inner wall 42a of the through hole 42, and the shaft 60 can smoothly moves along the through hole 42 extending in the Z axis direction.

Also, as shown in FIG. 4, the space 82 formed between the straight line portion 64b of the larger diameter part 64 and the inner wall 42a of the through hole 42 becomes the flow passageway to flow the control fluid present around the plunger 50 and inside the through hole 42, when shaft 60 moves in the axis direction. Note that, the cross section shape of the smaller diameter part 66 shown in FIG. 3 is circular shape, and the outer diameter of the smaller diameter part 66 is approximately the same as the distance (refer to FIG. 4) between the two straight lines 64b in the larger diameter part 64; however the shape of the smaller diameter part 66 is not limited thereto.

The position of the spool 30 shown in FIG. 1 in the Z axis is determined from the balance of the following three forces, the feedback force which the land 31 of the spool 30 receives from the control fluid, the spring force from the spring 18, and the electromagnetic force transferred via the center post 40 and the plunger 50. The solenoid valve 10 controls the electromagnetic force by controlling the electrical current supplied to the coil 75, by regulating the position of the spool 30 in the Z axis direction, thereby the desired output pressure is obtained in regards with the control fluid flowing out from the control port of the valve sleeve 20.

FIG. 5 is a cross section showing the relation of the relative position of the shaft 60 and the center post 40, and also FIG. 5 shows the condition wherein the plunger 50 and the shaft 60 has moved to the front end side at most. Under the condition that the plunger 50 and the shaft 60 has moved to the front end side at most, the collar part front end face 68a which is the end face of the front end side of the collar part 68 is brought into contact with the step face 44 of the center post 40.

Here, the collar part back end face 68b which is the end face at the back end side of the collar part 68 is attached against the plunger 50 so that it is brought into contact with the plunger front end face 52 of the plunger 50 as similar to the second end face 62b of the axis part 62. Therefore, under the condition shown in FIG. 5, the collar part 68 is prevented from moving towards the front end side of the plunger 50 by being placed between the plunger front end face 52 of the plunger 50 and the step face 44 of the center post 40, and also it functions as the buffering material which interferes the magnetic bonding of the plunger 50 and the center post 40. As illustrated in FIG. 5, an outer diameter of the step face 44 is almost the same as or slightly larger than an outer diameter of the plunger front end face 52. If the distance between the plunger 50 and the center post 40 becomes too close, the force of attracting the plunger 50 and the center post 40 rapidly changes and the position of the plunger 50 becomes difficult to control, however by placing the collar part 68 constituted by the non-magnetic material in between, the position control of the plunger 50 can be carried out suitably.

Figure 6:
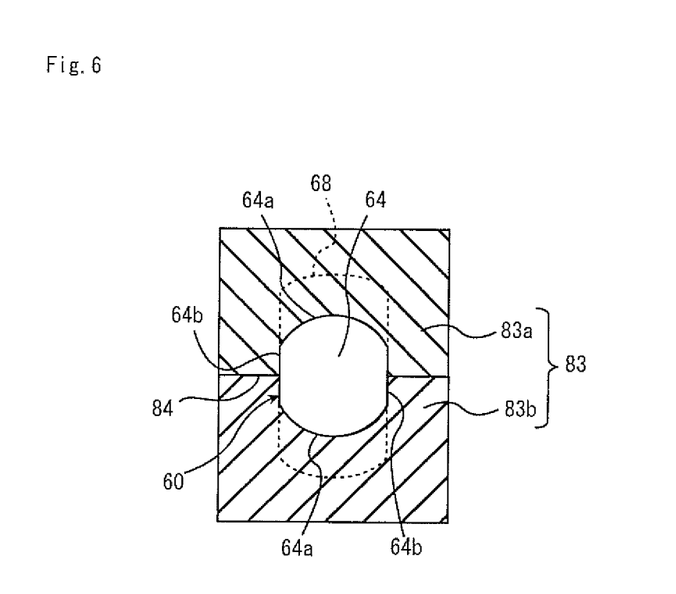
FIG. 6 is a cross section of one example of the shaft and the metal mold for molding the shaft.

FIG. 6 is a cross section showing one example of the shaft 60 and the metal mold 83 for molding the shaft 60. The metal mold 83 is constituted from a first metal mold 83*a* and a second metal mold 83*b* which are separate from each other, and the parting line 84 of the metal mold 83 is positioned at the straight line portion 64*b* of the larger diameter part 64. When the shaft 60 is produced by molding, the burr may be generated along the parting line 84, thus after the production of the shaft 60, there is a possibility of having the burr along the parting line, or the processing scar of the burr removal may be left. However, as shown in FIG. 4, the straight line portion 64*b* becomes the oil passage without sliding against the inner wall 42*a* of the through hole 42, thus even if the above mentioned burr or the process scar of removing the burr is present on the straight line portion 64*b*, it is very unlikely that these will interfere the smooth sliding of the shaft 60. Therefore, as shown in FIG. 6, by molding the shaft 60 by using the metal mold 83 having the parting line positioned at the straight line portion 64*b*, the shaft 60 which allows a smooth movement can be easily produced.

As mentioned in the above, the solenoid valve 10 of FIG. 1 or so comprises the shaft 60 wherein the axis part 62 which moves inside the through hole 42 of the center post 40 and the collar part 68 protruding out to the radial direction from the axis part 62 are made as one body. By using the shaft 60 wherein the axis part 62 and the collar part 68 preventing the contact of the plunger 50 and the center post 40 are made as one body, the solenoid valve 10 according to the present invention can be easily assembled as it is not necessary to additionally assemble the member to prevent the contact between the plunger and the center post.

Also, the shaft 60 is attached to the plunger 50 by providing the second end face 62*b* of the axis part 62 to the plunger front end face 52 of the plunger 50 (refer to FIG. 5). Therefore, at the plunger 50, there is no need to form a through hole or so for attaching the shaft 60. Also, as the shaft 60 comprises the collar part 68, the plunger 50 does not need to form the protrusions or so for preventing the magnetic bonding of the center post 40. Thus, the plunger 50 has very few mechanical processing necessary during the production, hence it is easily produced.

As shown in FIG. 4, the cross section outer peripheral form of the larger diameter part 64 at the axis part 62 has an oblong shape comprising the arc shape portion 64*a* and the straight line portion 64*b*. Such axis part 62 has the arc shape portion 64*a* slides against the inner wall 42*a* of the through hole 42, and the space 82 formed between the straight line portion 64*b* and the inner wall 42*a* of the through hole 42 becomes the oil passage, thereby the stable movement in the axial direction and the transfer of the force can be attained in simple shape.

Also, as shown in FIG. 3, the axis part 62 comprises two larger diameter parts 64 and the smaller diameter parts 66 placed between the larger diameter parts 64. The shaft 60 comprising such axis parts 62 can prevent the interference of the smooth movement in the Z axis direction as it is unlikely to be stuck inside the through hole, even when a large load is applied to the shaft 60 and the shaft 60 is slightly bent.

Other Embodiments

In the solenoid valve 10 shown in the above mentioned embodiment, as shown in FIG. 3, the axis part 62 of the shaft 60 comprises two larger diameter parts 64 and one smaller diameter part 66; however the number of the larger diameter parts 64 and the smaller diameter part 66 comprised in the axis part 62 are not particularly limited, and the axis part 62 may comprise more larger diameter parts 64 and the smaller diameter parts 66. Also, as shown in FIG. 4, the cross section outer peripheral shape of the larger diameter part 64 in the axis part 62 comprises two arc shape portions 64*a* and the straight line portions 64*b*, however the cross section outer peripheral shape is not limited thereto. The cross section outer peripheral shape of the larger diameter part 64 may comprise 3 or more arc shape portions, and also the notch portion which connects the arc shaped portion is not limited to a straight line, and it may be a curved line.

The invention claimed is:

1. A solenoid valve comprising;

a valve sleeve of cylindrical shape having an inner passage continuing in an axial direction, a spool arranged in a movable manner along said axial direction in said inner passage of said valve sleeve, a center post of cylindrical shape having a through hole connected with said inner passage of said valve sleeve and constituted from a magnetic material magnetized by a coil, a plunger constituted from a magnetic material and arranged in a movable manner along said axial direction against said center post by placing said center post between said spool and said plunger in said axial direction due to the magnetic force generated by the coil, a shaft constituted from a non-magnetic material comprising an axis part and a collar part, said axis part having one end face being contacted with said spool and other end face fixedly attached to a plunger front end face of said plunger and moving in said axial direction inside said through hole of said center post, and said collar part protruding out in a radial direction from said axis part so as to be formed as one body with said axis part and sandwiched between said plunger front end face and a step face opposing to said plunger front end face in said center post when said plunger closely approaches said center post, and a case part having said coil generating a magnetic force transferring to said center post and housing said center post, said plunger and said shaft in inside, wherein an outer diameter of said step face is almost same as or slightly larger than an outer diameter of said plunger front end face, a maximum diameter of said collar part is larger than an opening diameter of said through hole on said step face of said center post, said axis part including a first larger diameter portion having a first cross section outer peripheral shape, a second larger diameter portion having a second cross section outer peripheral shape, and a smaller diameter portion;

said first cross section outer peripheral shape having a first plurality of arc shaped portions arranged symmetrically against a center of said axis part, and a first plurality of notch portions connecting said first plurality of arc shaped portions, said second cross section outer peripheral shape having a second plurality of arc shaped portions arranged symmetrically against said center of said axis part, and a second plurality of notch portions connecting said second plurality of arc shaped portions, said smaller diameter portion extending from and between the first and second larger diameter portions in said axial direction and having a maximum diameter smaller than a maximum outer diameter of said first and second larger diameter portions in a cross section shape, said collar part connected to said first plurality of arc shaped portions.

2. The solenoid valve as set forth in claim 1 wherein said shaft is constituted from a resin material.

3. The solenoid valve as set forth in claim 1 wherein said first and second larger diameter portions are operable to slide against the inner wall of said through hole.

4. The solenoid valve as set forth in claim 2 wherein said shaft is molded by a metal mold and said shaft includes a parting line at said notch portion.

5. The solenoid valve as set forth in claim 2 wherein said first and second larger diameter portions are operable to slide against the inner wall of said through hole.

\* \* \* \* \*